United States Patent [19]

Yanase

[11] Patent Number: 4,910,641

[45] Date of Patent: Mar. 20, 1990

[54] WIRE HARNESS APPARATUS FOR INSTRUMENT PANEL

[75] Inventor: Takeshi Yanase, Kosai, Japan

[73] Assignee: Yazaki Corporation, Tokyo, Japan

[21] Appl. No.: 311,244

[22] Filed: Feb. 16, 1989

[30] Foreign Application Priority Data

Feb. 18, 1988 [JP] Japan ................... 63-34047

[51] Int. Cl.⁴ .............................................. H05K 7/10
[52] U.S. Cl. ................... 361/364; 296/146; 439/34
[58] Field of Search .............. 361/364, 371, 372, 373, 361/374, 375; 174/72 A; 296/146; 439/34

[56] References Cited

U.S. PATENT DOCUMENTS

| | | | |
|---|---|---|---|
| 2,403,132 | 7/1946 | Sparkes et al. | 361/372 |
| 3,146,052 | 8/1964 | Burch et al. | 439/34 |
| 3,549,951 | 12/1970 | Plummer | 361/372 |
| 4,750,265 | 2/1989 | Watanabe et al. | |

Primary Examiner—Roy N. Envall, Jr.
Attorney, Agent, or Firm—Armstrong, Nikaido, Marmelstein, Kubovcik & Murray

[57] ABSTRACT

A wire harness apparatus for an instrument panel comprises a meter panel mounted on an instrument panel and a wire harness having a connection block at its intermediate portion. The meter panel has meters on its front cover and at least one electrical connector on its rear cover. The harness is mounted on the dash board of a vehicle. A plurality of bus bars are disposed side by side in parallel to each other in the connection block. Some of wires of the wire harness are replaced by the bus bars. The connection block has at least one window through which the electrical connector is inserted in fitting-engagement. The electrical connector is matingly connected with the bus bars for electrical connection therebetween when the instrument panel is mounted to a dash board in place, thereby simultaneously making connection between the harness wire and the meter panel both electrically and mechanically.

2 Claims, 6 Drawing Sheets

FIG. 8  *PRIOR ART*
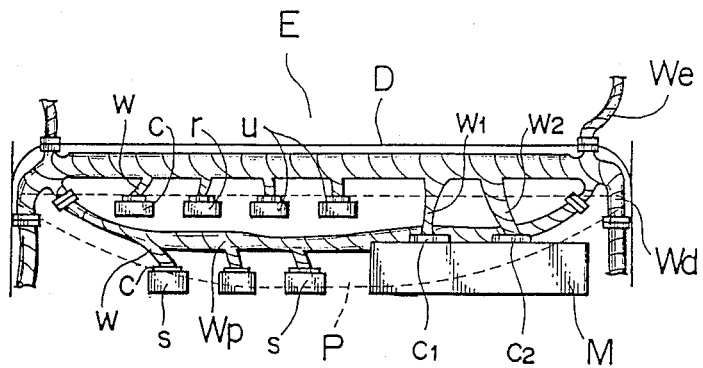
FIG. 9  *PRIOR ART*
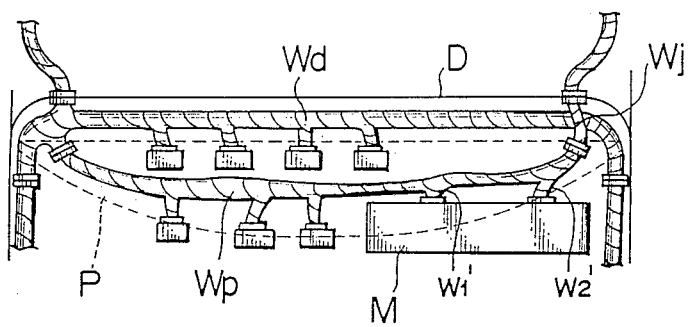

WIRE HARNESS APPARATUS FOR INSTRUMENT PANEL

BACKGROUND OF THE INVENTION

1. Field of the Invention

The present invention relates to a wire harness for an instrument panel of a vehicle, more particularly to a wire harness which simplifies a wiring manner in a vehicle and an assembly procedure of making electrical and mechanical connection between various electrical components and the wire harness.

2. Prior Art

FIG. 7 shows a prior art wiring manner associated with an instrument panel (referred to as panel hereafter) of a vehicle and FIG. 8 is an illustrative diagram thereof.

in FIGS. 7-8, a meter panel M, in which the various meters are incorporated, is secured to a panel P for transmitting various information to an operator of the vehicle. These information are supplied mainly from sensor etc. in an engine room E.

Around the meter panel M are provided a large number of electrical components including various switches s, control device u such as units and relays, and loads r such as motors, a cigar-lighter, and lighting bulbs, each being connected to a wire harness Wd on a dash board D side (vehicle body) or to a wire harness Wp on the panel P side.

Since most of the information sources are in the engine room as mentioned above, it is desirable to directly connect a harness We on engine-room side with the harness Wp on the panel side. It is, however, practically difficult. Thus the harness Wd is first installed on the body D then the harness We is connected thereto; the panel P is mounted to the body D; then the harness w1, w2 etc. branching from the Wd are drawn out to be connected with individual meters on the meter panel M; thereafter the meter panel M is mounted on the panel P. Such wiring methods must allow a relatively long play in length of the branching harnesses w1, w2 etc. for facilitating assembly work, thus requiring a large housing space. Thus this prior art wiring method involves a complexity of assembly steps including assembling the panel P to the body D and then assembling the meter panel to the panel.

FIG. 9 illustrates another method of mounting the wire harnesses Wd,Wp and the meter panel M. In the figure, the harness Wd is first installed on the body D; the panel P is mounted to the body D; then the harness Wp is connected to the harness We by means of a harness Wj and then to the harness Wd; then the harness w1', w2' etc. branching from the Wp are drawn out to be connected with individual meters on the meter panel M; thereafter the meter panel M is mounted on the panel P; then the panel P is mounted to the body D, thereby connecting the harness Wd on the body side with the harness Wp on the panel side. This wiring method, however, necessitates not only the a harness Wj for interconnecting the We and Wp but also extra wires and joints for both the harness Wd and the harness Wp, resulting in bulky, complex wire harnesses.

SUMMARY OF THE INVENTION

An object of the present is to provide a wire harness apparatus which simplifies the shape of wire harnesses in an instrument panel of easy routing thereof while also providing for easy installment of the meter panel to the instrument panel and simultaneous electrical and mechanical connection therebetween.

A wire harness apparatus comprises a meter panel mounted on an instrument panel and a wire harness having a connection block at its intermediate portion. The meter panel has meters such as a speedometer and a tachometer on its front cover and at least one electrical connector on its rear cover. The harness is mounted on the dash board of a vehicle. A plurality of bus bars are disposed side by side in parallel to each other in the connection block. Some of wires of the wire harness are replaced by the bus bars. The connection block has at least one window through which the electrical connector is inserted in fitting-engagement when the instrument panel is mounted to the dash board of the vehicle. The electrical connector is matingly connected with the bus bars for electrical connection therebetween when the instrument panel is mounted to a dash board in place, thereby simultaneously making connection between the harness wire and the meter panel both electrically and mechanically.

BRIEF DESCRIPTION OF THE DRAWINGS

Further features and details of the invention will be apparent from the description of specific embodiments which are given by way of example with reference to the accompanying drawings, in which:

FIG. 8 is a diagram for illustrating how the prior art wiring is performed.

FIG. 9 is a diagram for illustrating another way of wiring in the prior art.

DETAILED DESCRIPTION OF THE INVENTION

Figure 1:
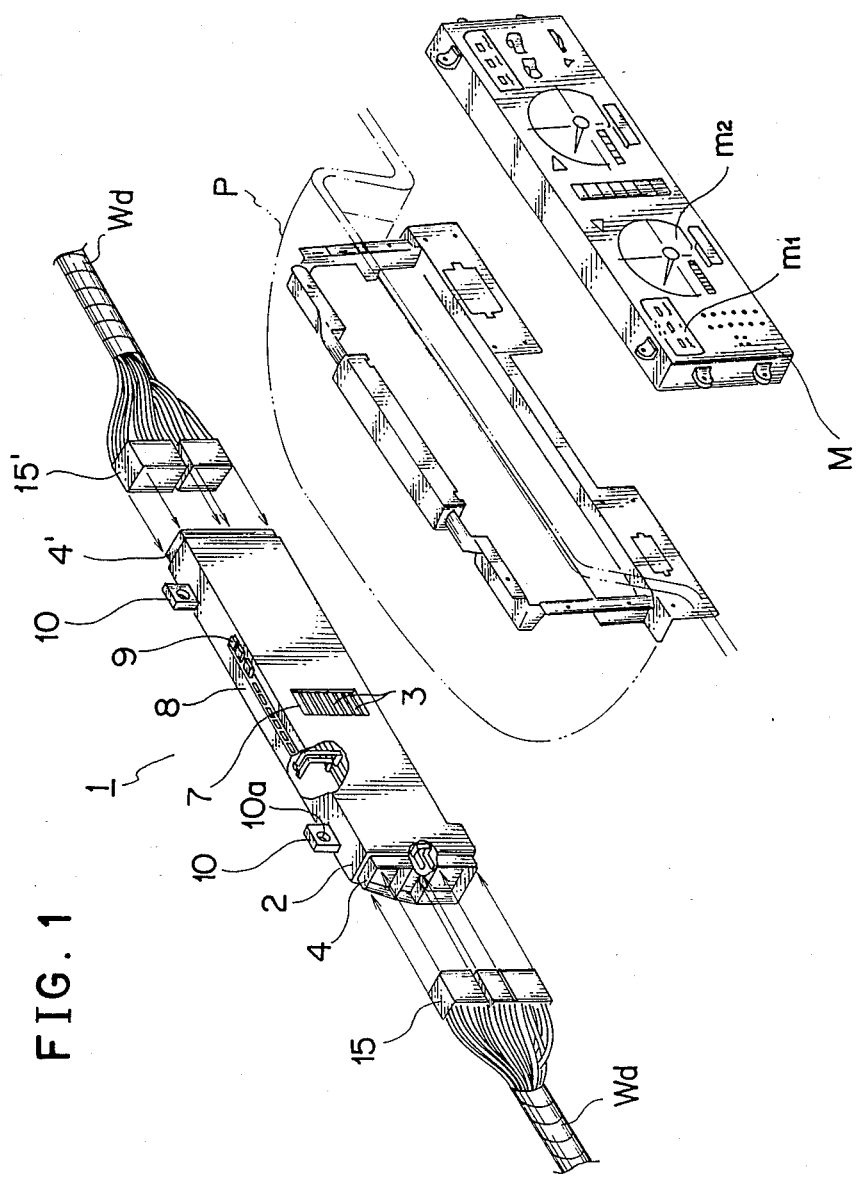
FIG. 1 is an exploded perspective view of a wire harness apparatus according to the present invention.

Referring to FIG. 1, an elongate rectangular shaped connection block 1 is inserted in a wire harness Wd mounted on a vehicle body. On each longitudinal opening end of the block 1 is formed a connector 4,4' into which a connector 15,15' assembled on the wire harness Wd are inserted for electrical connection.

Figure 2:
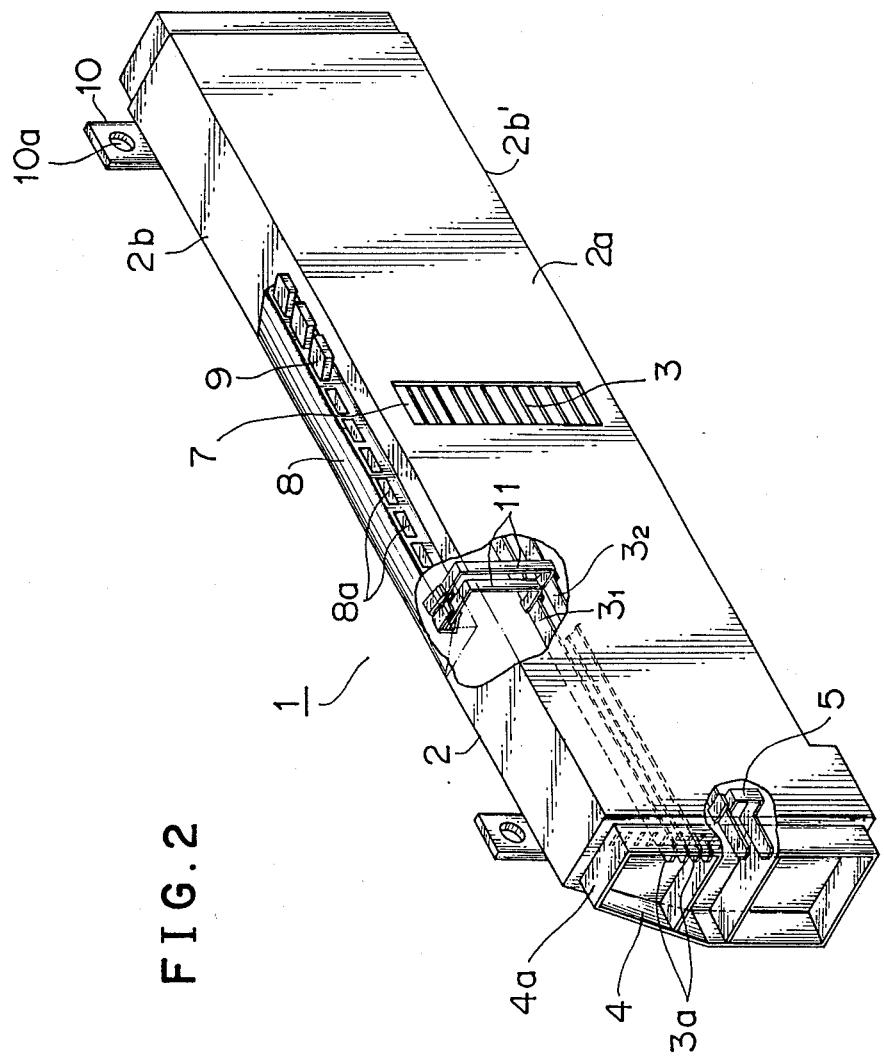
FIG. 2 is an expanded perspective view of the wire harness apparatus shown in FIG. 1.
Figure 3A:
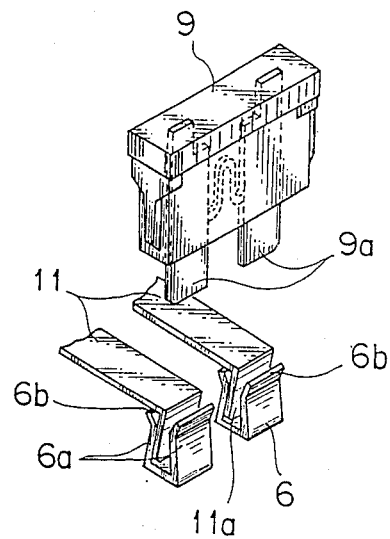
FIG. 3A and FIG. 3B are perspective views for showing electrical connection between bus bars and fuses by means of clip terminals.
Figure 3B:
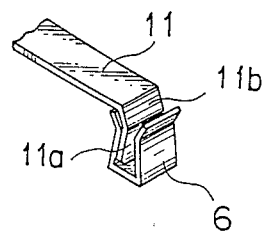

Within the block 1 are provided a plurality of elongate plate-shaped bus bars disposed side by side in parallel to each other. As shown in FIG. 2, the bus bars are disposed to project at tip ends 3a thereof into an insulating housing 4a formed integrally with a case 2 of the block 1, thereby serving as male connection terminals. A bridge-shaped junction terminal 5 may be provided as required for electrical connection between one bus bar 3 and the other by means of a clip terminal 6 as shown in FIGS. 3A-3B. On a front wall 2a of the case 2 is provided a window 7 through which electrical connection is made between the meter panel M. On an upper wall 2b is formed a fuse case 8 having the plurality of cavities 8a into which conventional knife-shaped fuses 9 are inserted. A mounting strap 10 are provided at suitable positions on the upper wall 2b and a lower wall 2b' of the case 2.

Electrical connection between the knife-shaped fuses 9 and the bus bars $3_1$, $3_2$ is made a follows. U-shaped interconnecting bus bars 11 are connected at one terminal ends thereof to different bus bars $3_1$ and $3_2$, respectively, and inserted at the other terminal ends 11a thereof into a pair of resiliently-supporting pinch strap 6a, 6a. The knife-shaped fuse 9 is then pressed into the resilient gap between the strap 6a and the bus bars 11. The interconnection bus bars 11 may be provided with a tapered portion 11b at the bent portion thereof for easy insertion of the fuses 9 since one of the insertion guides 6b, 6b is hidden behind the corner portion that is bent at right angle.

Figure 4A:
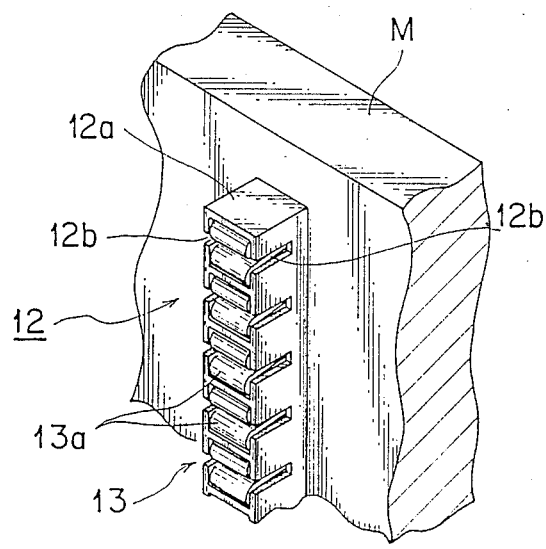
FIG. 4A and FIG. 4B are expanded perspective views of a connector on the rear side of a meter panel of the present invention.
Figure 4B:
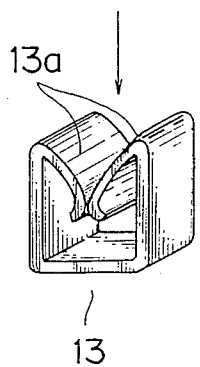
Figure 5:
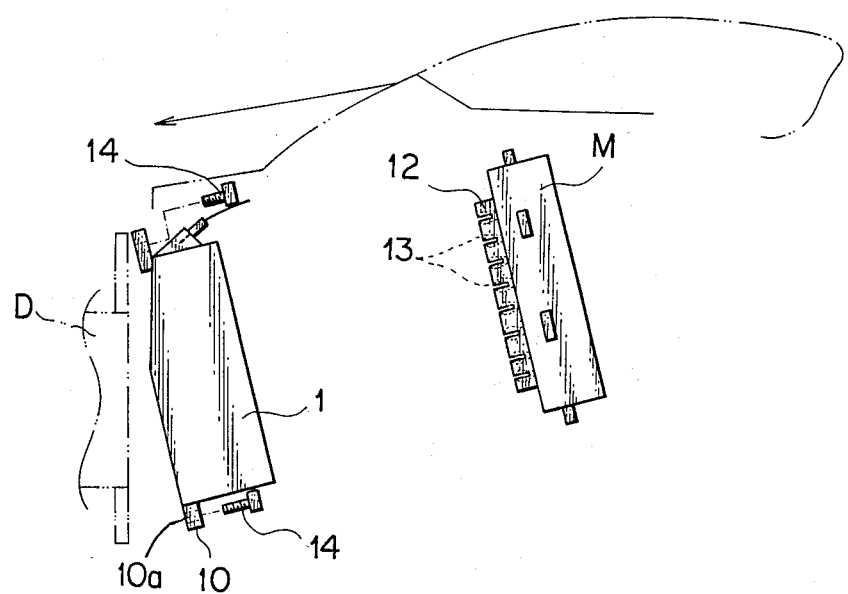
FIG. 5 is a side view for showing how the wiring apparatus according to the invention is installed to the vehicle body.

On a rear cover of the meter panel M is provided a connector 12 which matingly fits to the previously described window 7 as shown in FIG. 4A. The connector 12 has a frame-like insulating housing 12a in which a plurality of contact terminals 13 of a clip type, similar to the clip terminals 6 shown in FIGS. 3A-3B, are incorporated. On both parallel side walls of the insulating housing 12a are provided a plurality o f guide slits 12b which extend in the direction of engagement with the bus bars to guide the stated bus bars 3 between the resiliently-supporting pinch straps 13a, 13a as shown by an arrow in FIG. 4B. The guide slits 12b have a width of slightly wider than the thickness of the elongate plate-shaped bus bars 3. The contact terminals 13 are fixed to the meter panel M and are connected through, for example, soldering to lead wires or lead circuits of various meters m1,m2,... etc. within the meter panel M.

According to the present invention, mounting the harnesses and electrical connection and mechanical assembly are carried out as follows.

Figure 6:
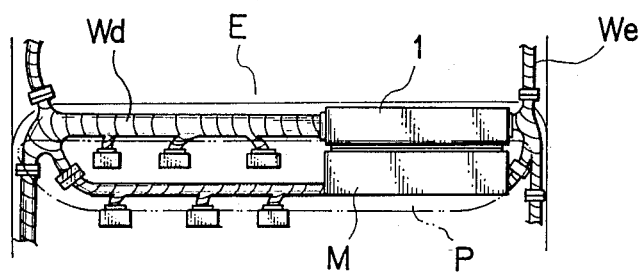
FIG. 6 is a diagram for illustrating how the wire harness is routed in the vehicle by means of the wiring apparatus according to the invention.
Figure 7:
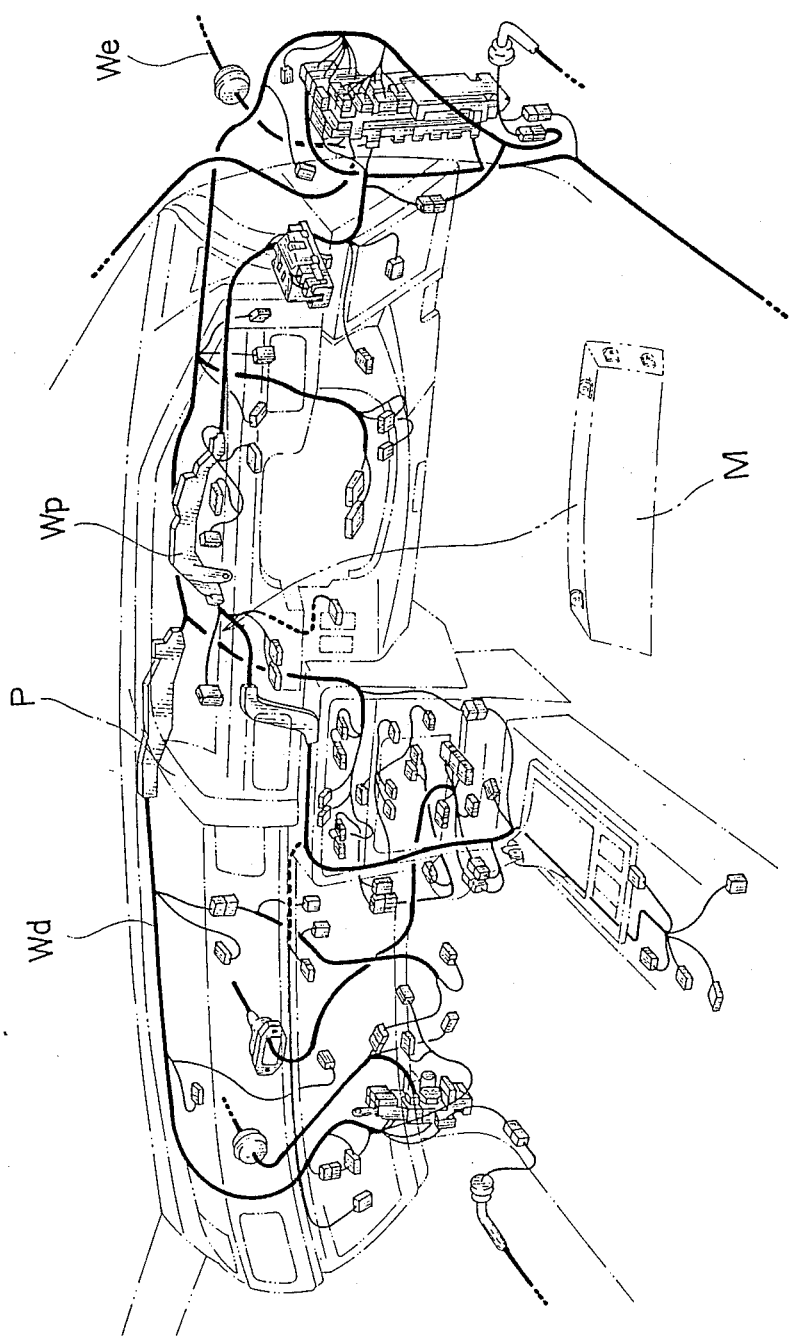
FIG. 7 is a perspective view for showing how the prior art wiring is made in the proximity of an instrument panel.

The connection block 1 is first fixed to the dash board D by means of a bolt 14 inserted through a bolt hole 10a of a mounting strap 10. Then the connectors 15,15' assembled on the wire ends of the harness Wd are matingly connected to the connectors 4,4', respectively. Thereafter the harness Wp is positioned in place within the panel P as shown in FIG. 6. The meter panel M is then fixed to the panel P by means of, for example, screws. The panel P is then mounted to the dash board D in a manner similar to the prior art method, which permits the connector 12 on the rear cover of the meter panel M to be guided into the connection block 1 through the window in fitting relation. Thus each of the bus bars 3 will be guided by the slit 12b of the connector 12 into a contact terminal 13 i.e., a mating terminal thereof.

In this manner, electrical connection of the meters in the meter panel M is achieved at the same time as the panel P is mechanically assembled to the dash board D.

Implementing the harness Wd in a block form eliminates complexity of structure thereof and mechanical fitting-connection of the connector 12 through the window 7 permits both electrical and mechanical connection simultaneously. Thus the branching harnesses w1', w2'. . . and assembly stages of individual connector-to-connector fitting procedures are no longer necessary, thereby significantly improving workability as well as making the wire apparatus more space-saving.

The bus bars in the connection block 12 are suitable for branching circuits by use of the junction terminals 5 and interconnection bus bars 11 as shown in FIG. 2, facilitating addition or deletion of the circuits.

The construction similar to that of the connector 12 and the window 7 can also be used, if required, for connecting the block 1 with the previously described control devices u and the loads z.

What is claimed:

1. A wire harness apparatus for an instrument panel comprising:
    a wire harness secured to a dash board of a vehicle, said wire harness having a connection block at a intermediate portion thereof, said connection block having a plurality of bus bars therein disposed side by side in parallel to each other, some of wires of said wire harness being replaced by said bus bars, said connection block having at least one window through which electrical connection is made to said bus bars from outside thereof; and
    a meter panel mounted on an instrument panel of said vehicle, said meter panel having meters on a front cover thereof and having at least one electrical connector on a rear cover thereof adapted to engage said window in fitting relation, said connector having a plurality of contact terminals for making electrical connection between said meters and said bus bars; wherein
    when said instrument panel is mounted to the dash board in place, said electrical connector is first guided into said window through fitting relation and is then matingly connected with said bus bars to thereby make electrical connection between said meters and said bus bars.

2. A wire harness apparatus for an instrument panel according to claim 1, wherein said connector has a pair of parallel wall members, said contact terminals being clip terminals disposed between said pair of parallel walls, said pair of parallel wall members having a plurality of guide slits thereon on both sides of each one of said terminals, each one of said bus bards being guided by said guide slits on both sides of each of said terminals to thereby be inserted into each one of said clip terminals of electrical connection with said clip terminals when said instrument panel is mounted to the dash board in place.

* * * * *